(12) United States Patent
Zhu et al.

(10) Patent No.: US 12,532,383 B2
(45) Date of Patent: Jan. 20, 2026

(54) MODE CONFIGURATION METHOD AND APPARATUS, AND DEVICE AND STORAGE MEDIUM

(71) Applicant: ZTE CORPORATION, Shenzhen (CN)

(72) Inventors: Hao Zhu, Shenzhen (CN); Lin Chen, Shenzhen (CN); Tao Qi, Shenzhen (CN); Zijiang Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 495 days.

(21) Appl. No.: 17/921,940

(22) PCT Filed: Apr. 26, 2021

(86) PCT No.: PCT/CN2021/089839
§ 371 (c)(1),
(2) Date: Jan. 20, 2023

(87) PCT Pub. No.: WO2021/218897
PCT Pub. Date: Nov. 4, 2021

(65) Prior Publication Data
US 2023/0180350 A1 Jun. 8, 2023

(30) Foreign Application Priority Data
Apr. 27, 2020 (CN) .......... 202010345812.5

(51) Int. Cl.
*H04H 20/71* (2008.01)
*H04W 76/40* (2018.01)

(52) U.S. Cl.
CPC .................. *H04W 76/40* (2018.02)

(58) Field of Classification Search
CPC ....... H04W 76/40; H04W 4/06; H04W 72/30; H04W 72/231
USPC ......................................................... 370/312
See application file for complete search history.

(56) References Cited

U.S. PATENT DOCUMENTS

| | | | | |
|---|---|---|---|---|
| 7,970,002 B2 * | 6/2011 | Hu | ........................ | H04W 72/30 370/312 |
| 10,129,710 B2 * | 11/2018 | Lee | ........................ | H04W 72/30 |
| 2006/0068793 A1 * | 3/2006 | Van Lieshout | ....... | H04W 72/30 455/444 |

(Continued)

FOREIGN PATENT DOCUMENTS

| CN | 1921641 A | 2/2007 |
|---|---|---|
| CN | 101163324 A | 4/2008 |

(Continued)

OTHER PUBLICATIONS

Extended European Search Report in Application No. 217956234, dated Jul. 28, 2023, 9 pages.

(Continued)

*Primary Examiner* — Chuong T Ho
(74) *Attorney, Agent, or Firm* — Morgan, Lewis & Bockius LLP (57) ABSTRACT

Provided are a mode configuration method and apparatus, a device and a storage medium. The mode configuration method is applied by a first communication node and comprises: receiving first information and configuring a bearer mode based on the first information; and receiving multicast/broadcast service (MBS) data using the configured bearer mode.

15 Claims, 5 Drawing Sheets

(56) References Cited

U.S. PATENT DOCUMENTS

| | | | | |
|---|---|---|---|---|
| 2012/0033605 | A1* | 2/2012 | Yang | H04W 72/30 |
| | | | | 370/312 |
| 2014/0301267 | A1* | 10/2014 | Gou | H04L 12/189 |
| | | | | 370/312 |
| 2018/0146260 | A1* | 5/2018 | Li | H04N 21/2393 |
| 2019/0098571 | A1* | 3/2019 | Kim | H04W 52/0206 |
| 2020/0245184 | A1* | 7/2020 | Jin | H04L 45/74 |
| 2021/0068004 | A1* | 3/2021 | Kadiri | H04L 47/15 |
| 2023/0180349 | A1* | 6/2023 | Zhu | H04W 4/06 |
| | | | | 370/312 |

FOREIGN PATENT DOCUMENTS

| | | |
|---|---|---|
| CN | 101170466 A | 4/2008 |
| CN | 102821362 A | 12/2012 |
| CN | 111901765 A | 11/2020 |
| WO | WO2004064342 A1 | 7/2004 |

OTHER PUBLICATIONS

"3rd Generation Partnership Project; Technical Specification Group Radio Access Network; Introduction of the Multimedia Broadcast/Multicast Service (MRMS) in the Radio Access Network (RAN); Stage 2 (Release 15)", 3GPP Draft; 25346-F00, 3rd Generation Partnership Project (3GPP), Mobile Competence Centre ; 650, Route Des Lucioles ; F-06921 Sophia-Antipolis Cedex ; France, Jun. 29, 2018 (Jun. 29, 2018), XP051589510, Retrieved from the Internet: URL:http://www.3gpp.org/ftp/tsg%5Fran/WG6%5FlegacyRAN/TSGR6%5F08/Implemented%20specs%20after%20TSG%20RAN%5F80/Upgraded%20specs%20fr0m%20Rel%2D14%2010%20Rel%2D15/25346%2Df00%2Ezip [retrieved on Jun. 29, 2018].

International Search Report in Application No. PCT/CN2021/089839, dated Jul. 1, 2021, 4 pages, including English translation.

Samsung, "Summary of Offline Discussion on CB: #72_MBS_PTP-PTM_DynChg", 3GPP TSG-RAN WG3 #111-e, R3-211028, Jan. 25-Feb. 4, 2021, online, 10 pages.

First Office Action in European Application No. 21795623.4, dated Jul. 16, 2024, 7 pages.

ITRI. "Enhancement of eMBMS for Group communication", 3GP TSG RAN WG2 #84, R2-134029, San Francisco, USA, Nov. 11-15, 2013, URL:http://www.3gpp.org/ftp/tsg°/05Fran/WG6°/05FlegacyRAN/TSGR6°/05F08/Implemented°/020 specs°/020after°/020TSG°/020RANcY05F80/Upgraded°/020specs°/020from°/020RelcY02D14%20to%20ORelcY02D15/25346%2Df00°/02Ezip [retrieved on Jun. 29, 2018].

First Office Action in Chinese Application No. 202010345812.5, dated Aug. 1, 2025, 22 pages, including translation.

* cited by examiner

MODE CONFIGURATION METHOD AND APPARATUS, AND DEVICE AND STORAGE MEDIUM

CROSS-REFERENCES TO RELATED APPLICATIONS

This is a national stage application filed under 35 U.S.C. 371 based on International Patent Application No. PCT/CN2021/089839, filed on Apr. 26, 2021, which claims priority to Chinese Patent Application No. 202010345812.5 filed with the China National Intellectual Property Administration (CNIPA) on Apr. 27, 2020 disclosures of which are incorporated herein by reference in their entireties.

TECHNICAL FIELD

The present application relates to wireless communication networks, for example, to a mode configuration method and apparatus, a device and a storage medium.

BACKGROUND

The 5G-related technologies are mainly related to a unicast service scenario, that is, a point-to-point (PTP) service mode. A point-to-multipoint (PTM) service mode scheme has not yet emerged. In addition, with the rapid increase in the number of users and the multiple-dimension of application scenarios, the PTM service mode inevitably becomes one of the indispensable traffic modes. How to reasonably and effectively achieve the multicast/broadcast service under the technical framework of 5G new radio (5G-NR) is an urgent problem to be solved at present.

SUMMARY

The present application provides a mode configuration method and apparatus, a device and a storage medium.

In a first aspect, an embodiment of the present application provides a mode configuration method. The method includes the following operations.

First information sent by a first communication node is received.

A mode for receiving multicast/broadcast service (MBS) data is managed based on the first information.

In a second aspect, an embodiment of the present application provides a mode configuration method. The method is applied by a second communication node and includes the following operations.

Third information sent by a third communication node is received.

First information is determined based on the third information, where the first information is used for instructing a first communication node to configure a bearer mode.

In a third aspect, an embodiment of the present application provides a mode configuration apparatus. The apparatus includes a configuration module and a first receiving module.

The configuration module is configured to receive first information and configure a bearer mode based on the first information.

The first receiving module is configured to receive MBS data using the configured bearer mode.

In a fourth aspect, an embodiment of the present application provides a mode configuration apparatus. The apparatus is configured in a second communication node and includes a second receiving module and a second sending module.

The second receiving module is configured to receive third information sent by a third communication node.

The second sending module is configured to determine first information based on the third information and send the first information to a first communication node, where the first information is used for instructing the first communication node to configure a bearer mode.

In a fifth aspect, an embodiment of the present application provides a device.

The device includes one or more processors and a memory.

The memory is configured to store one or more programs.

The one or more programs, when executed by the one or more processors, enable the one or more processors to perform the method in any of the embodiments of the present application.

In a sixth aspect, an embodiment of the present application provides a storage medium. The storage medium is configured to store a computer program, where the computer program, when executed by a processor, performs the method in any of the embodiments of the present application.

DETAILED DESCRIPTION

Embodiments of the present application will be described hereinafter in detail with reference to the drawings. It is to be noted that if not in collision, the embodiments and features therein in the present application may be combined with each other.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from the sequences described herein.

The technical solutions of the present application can be applied to various communication systems such as Global System for Mobile Communications (GSM) systems, Code-Division Multiple Access (CDMA) systems, Wideband Code-Division Multiple Access (WCDMA) systems, General Packet Radio Service (GPRS) systems, Long Term Evolution (LTE) systems, Advanced Long Term Evolution (LTE-A) systems, Universal Mobile Telecommunications System (UMTS), fifth generation mobile networks (5G) systems, and the like, and the communication system is not limited in the embodiments of the present application. In the present application, the 5G system is used as an example for description.

Figure 1:
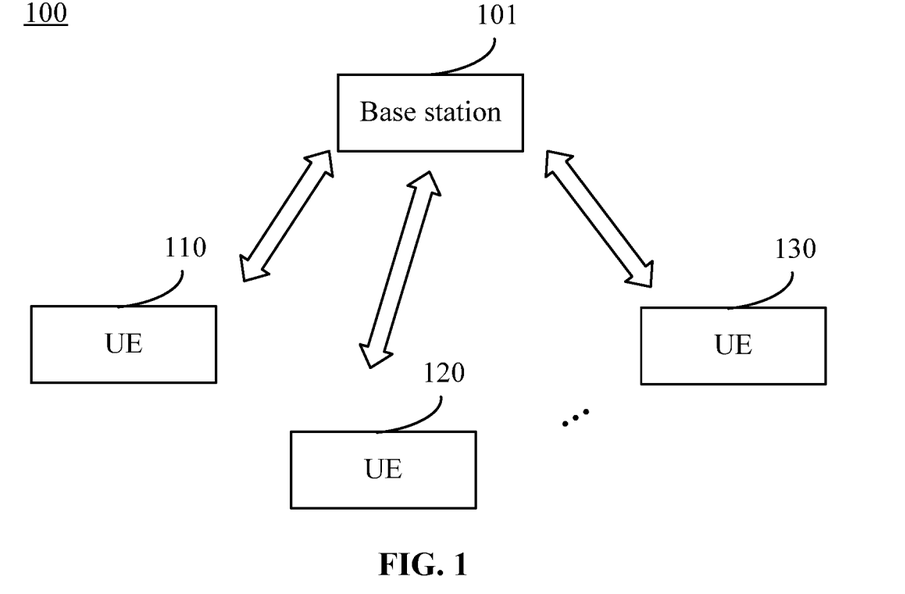
FIG. 1 is a structure diagram of a wireless network system according to an embodiment of the present application.

The embodiments of the present application may be applied to radio networks of different standards. Radio access networks may include different communication nodes in different systems. FIG. 1 is a structure diagram of a wireless network system according to an embodiment of the present application. As shown in FIG. 1, the wireless network system 100 includes a base station 101, a user equipment (UE) 110, a UE 120 and a UE 130. The base station 101 performs wireless communication with the UE 110, the UE 120 and the UE 130, respectively.

It is to be noted that in the embodiments of the present application, the base station may be a device capable of communicating with a UE. The base station may be any device having a wireless transceiving function and includes, but is not limited to, a NodeB, an evolved NodeB (eNodeB), a base station in the 5G communication system, a base station in a future communication system, an access node in a Wireless Fidelity (Wi-Fi) system, a wireless relay node, and a wireless backhaul node. The base station may also be a wireless controller in a cloud radio access network (C-RAN) scenario; the base station may also be a small station and a transmission reference point (TRP). The base station is not limited in the embodiments of the present application.

In the embodiments of the present application, the UE is a device having a wireless transceiving function. The UE may be deployed on land, for example, the UE may be an indoor or outdoor device, a hand-held device, a wearable device, and a vehicle-mounted device. The UE may also be deployed on the water (for example, on a ship). The UE may also be deployed in the air (for example, on an airplane, a balloon, a satellite, and the like). The UE may be a mobile phone, a Pad, a computer having a wireless transceiving function, a virtual reality (VR) terminal, an augmented reality (AR) terminal, a wireless terminal for industrial control, a wireless terminal for self-driving, a wireless terminal for remote medicine, a wireless terminal for smart grid, a wireless terminal for transportation safety, a wireless terminal for smart city, a wireless terminal for smart home, and the like. The application scenarios are not limited in the embodiments of the present application. The UE may also sometimes be referred to as a terminal, an access terminal, a UE unit, a UE station, a mobile station, a mobile, a remote station, a remote terminal, a mobile device, a UE terminal, a wireless communication device, a UE agent, a UE device, and the like, and the UE is not limited in the embodiments of the present application.

The mobile network may be divided into a core network (CN), a radio access network (RAN), and a UE. The bearer between the RAN and the UE is referred to as the radio bearer (RB). In the 3rd generation and 4th generation mobile networks, a UE in a cell may receive a multicast/broadcast service (MBS) through a bearer of a PTM mode. If a specific UE wishes to establish a bearer of a PTP mode, a network needs to provide the UE with a PTP bearer between network elements such as core network elements, radio access network elements and UEs, and which mode of bearers that the UE establishes needs to be decided by the core network.

The present application provides a method for a UE to flexibly switch between a PTP mode and a PTM mode.

Figure 2:
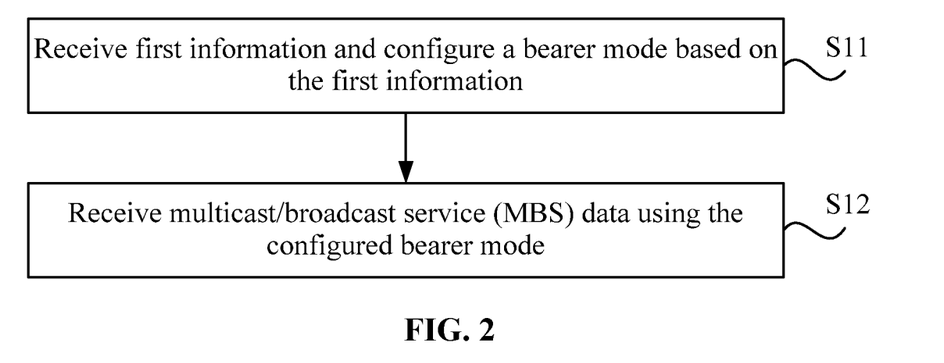
FIG. 2 is a flowchart of a mode configuration method according to an embodiment of the present application.

In an embodiment, the present application provides a mode configuration method. FIG. 2 is a flowchart of a mode configuration method according to an embodiment of the present application. The method may be applied to the case where a UE switches from one RB mode to another RB mode. This method may be executed by a mode configuration apparatus provided by the present application, and the mode configuration apparatus may be implemented by software and/or hardware. The method is applied to a UE.

As shown in FIG. 2, the mode configuration method provided by the present application mainly includes S11 and S12.

In S11, first information is received and a bearer mode is configured based on the first information.

In S12, MBS data is received using the configured bearer mode.

In this embodiment, the preceding mode configuration method is applied to a UE, and the UE may be any one of the UEs described above and is not limited in this embodiment.

The first communication node may be understood as any of the UE described above and is not limited in this embodiment.

Further, a UE receives the first information transmitted by a base station.

In an embodiment, if a PTP bearer corresponding to an MBS identifier (ID) is required to be established, the configuration of a PTP RB carried by a radio resource control (RRC) message sent by a base station is received.

In an embodiment, if corresponding PTM RBs related to the MBS session are required to be established, a PTM bearer configuration sent by a base station is received. The PTM bearer configuration may be acquired from the received RRC message, may be acquired from a broadcast message and/or may adopt a default configuration.

It is to be noted that the configuration of the PTP RB and the configuration of the PTM RB will not be repeated in detail in the present application.

In an example embodiment, the first information includes one or more of the following: an MBS ID, an MBS ID index, first mode indication information, or first bearer configuration information, where the MBS ID index uniquely indexes one MBS ID.

In an example embodiment, MBS ID indexes are sorted according to the magnitudes of MBS IDs.

In this embodiment, in a case where the first information is carried by an RRC message, the first information includes an MBS ID, first mode indication information, and first bearer configuration information.

In this embodiment, in a case where the first information is carried by a MAC CE message, when the MAC CE message is of a fixed length, the first information includes an MBS ID, first mode indication information, and first bearer configuration information.

In this embodiment, in a case where the first information is carried by a MAC CE message, when the MAC CE message is of a variable length, the first information includes an MBS ID index, first mode indication information, and first bearer configuration information.

In an example embodiment, in a case where the first information is carried by an RRC message, the first information is sent by a centralized unit (CU); and in a case where the first information is carried by a MAC CE message, the first information is sent by a distributed unit (DU).

In an example embodiment, the MBS ID includes one or more of the following: an MBS session ID, an MBS service ID, a quality of service (QOS) flow ID, or a bearer ID.

The bearer ID includes one or more of the following: a radio bearer ID, a mode indication, a data radio bearer (DRB) ID, or a multicast/broadcast bearer ID.

The multicast/broadcast bearer ID includes one or more of the following: a broadcast bearer ID, a multicast bearer ID, a unicast bearer ID, a PTP bearer ID, or a PTM bearer ID.

In an example embodiment, in a case where the first information is carried by an RRC message, the first information is sent by a CU; and in a case where the first information is carried by a MAC CE message, the first information is sent by a DU.

It is to be further noted that the first information may be sent by the CU or may be sent by the DU, which is not limited in this embodiment.

Optionally, the first information sent by the CU is determined by third information sent by the DU to the CU. Optionally, the first information sent by the DU is determined by third information sent by the CU to the DU. For the content included in the third information, reference may be made to the description of the following embodiments, and details will not be repeated herein.

In an example embodiment, the first information may be broadcast to a group of UEs or all UEs in a cell. In another example embodiment, the first information may be unicast to one UE.

In an example embodiment, the first mode indication information is used for indicating a mode to be used for receiving the MBS data.

In an example embodiment, the operation where the MBS data is received using the configured bearer mode includes one or more of the following operations.

The MBS data is received using a PTM mode.
The MBS data is received using a PTP mode and a PTM mode.
The MBS data is received using a PTP mode.

In this embodiment, the PTP mode means that the UE and the base station adopt a point-to-point communication mode, and the bearer of the PTP mode may be a DRB bearer, a unicast RB bearer or a PTP bearer. The PTM mode means that the UE and the base station adopt a point-to-multipoint communication mode, and the bearer in the PTM mode may be an RB bearer, a broadcast RB bearer or a PTM bearer. The PTP bearer may refer to a unicast bearer and may be understood as the data sent by the base station to a single UE. The PTM bearer may refer to a multicast bearer or a broadcast bearer and may be understood as the data sent by the base station to a group of UEs or all UEs in a cell.

In an example embodiment, the MBS data is data corresponding to an MBS ID associated with the first mode indication information and includes one or more of the following:
  in a case where the first mode indication information is associated with a bearer ID, data corresponding to a QoS flow associated with the bearer;
  in a case where the first mode indication information is associated with an MBS service ID, data corresponding to the MBS service ID;
  in a case where the first mode indication information is associated with an MBS session ID, data corresponding to the MBS session; or
  in a case where the first mode indication information is associated with a QoS flow ID, data corresponding to the QoS flow.

In an example embodiment, in a case where the first mode indication information indicates that the MBS data is received using a PTM mode, the operation where the bearer mode is configured based on the first information includes one or more of the following operations.
  A PTM bearer is established.
  A PTM bearer is resumed.

In an example embodiment, in a case where the MBS data is being received using a PTP bearer of an unacknowledged mode (UM) before the first information is received, a PTM bearer is established, and the PTP bearer is released.

Alternatively, in a case where the MBS data is being received using a PTP radio bearer of a UM mode before the first information is received, a PTM bearer is resumed, and a PTP bearer is suspended.

In an example embodiment, in a case where the MBS data is being received using a PTP bearer of an acknowledged mode (AM) before the first information is received, a packet data convergence protocol (PDCP) state report is sent to the CU, and a PTM bearer is established or a PTM bearer is resumed.

In an example embodiment, in a case where the MBS data is being received using a PTP mode and a PTM mode before the first information is received, a PTM bearer is released or a PTP bearer is suspended.

In an example embodiment, in a case where the first mode indication information indicates that the MBS data is received using the PTM mode, the method includes one or more of the following operations.

In a case where the MBS data is being received using a PTP bearer of a UM mode before the first information is received, a PTM bearer is established, the PTM bearer is initiated to receive data, and the PTP bearer is released.

In a case where the MBS data is being received using a PTP bearer of a UM mode before the first information is received, a PTM bearer is resumed, the PTM bearer is initiated to receive data, and the PTP bearer is suspended.

In a case where the MBS data is being received using a PTP bearer of an AM mode before the first information is received, when the PDCP resumption sent by the CU is received, a PDCP state report is sent to the CU; the mode for receiving the MBS data is determined as PTM based on the first mode indication information in the first information, a PTM bearer is established, and the PTM bearer is initiated to receive the MBS data.

In a case where the MBS data is being received using a PTP mode and a PTM mode before the first information is received, a PTP bearer is released.

In a case where the MBS data is being received using a PTP mode and a PTM mode before the first information is received, a PTP bearer is suspended.

In an example embodiment, in a case where the first mode indication information indicates that the MBS data is received using a PTP mode, the operation where the bearer mode is configured based on the first information includes one or more of the following operations.
  A PTP bearer is established.
  A PTP bearer is resumed.

In an example embodiment, in a case where the MBS data is being received using a PTM bearer before the first information is received, a PTP bearer is established, and the PTM bearer is released.

In a case where the MBS data is being received using a PTM bearer before the first information is received, a PTP bearer is resumed, and the PTM bearer is suspended.

In an example embodiment, in a case where the MBS data is being received using a PTP mode and a PTM mode before the first information is received, a PTM bearer is released or a PTM bearer is suspended.

In an example embodiment, in a case where the first mode indication information indicates that the MBS data is received using a PTP mode and the PTM mode, the operation where the bearer mode is configured based on the first information includes one or more of the following operations.

In a case where the MBS data is being received using a PTM bearer before the first information is received, a PTP bearer is established or a PTP bearer is resumed.

In a case where the MBS data is being received using a PTP bearer before the first information is received, a PTM bearer is established or a PTM bearer is resumed.

In an example embodiment, in a case where the first mode indication information indicates that the MBS data is received using a PTP mode, the method includes one or more of the following operations.

In a case where the MBS data is being received using a PTM bearer before the first information is received, a PTP bearer is established, the PTP bearer is initiated to receive data, and the PTM bearer is released.

In a case where the MBS data is being received using a PTM bearer before the first information is received, a PTP bearer is resumed, the PTP bearer is initiated to receive data, and the PTM bearer is suspended.

In a case where the MBS data is being received using a PTP mode and a PTM mode before the first information is received, a PTP bearer is released.

In a case where the MBS data is being received using a PTP mode and a PTM mode before the first information is received, a PTP bearer is suspended.

In an example embodiment, in a case where the first mode indication information indicates that the MBS data is received using the PTP mode and the PTM mode, the method includes one or more of the following operations.

In a case where the MBS data is being received using a PTM bearer before the first information is received, a PTP bearer is established, and the PTP bearer is initiated to receive data.

In a case where the MBS data is being received using a PTM bearer before the first information is received, a PTP bearer is resumed, and the PTP bearer is initiated to receive data.

In a case where the MBS data is being received using a PTP bearer before the first information is received, a PTM bearer is established, and the PTM bearer is initiated to receive data.

In a case where the MBS data is being received using a PTP bearer before the first information is received, a PTM bearer is resumed, and the PTM bearer is initiated to receive data.

In an example embodiment, the PTP bearer is a PTP bearer used to receive the MBS data, and the PTM bearer is a PTM bearer used to receive the MBS data.

In this embodiment, the operation where the PTP bearer is resumed includes one or more of the following actions: an action of suspending the PTP bearer is revoked, or the PTP bearer is initiated or used to receive the MBS data.

The operation where the PTM bearer is resumed includes one or more of the following actions: an action of suspending the PTM bearer is revoked, or the PTM bearer is initiated or used to receive the MBS data.

In an example embodiment, the first bearer configuration information is used for instructing a bearer to perform one or more of the following operations.

A bearer is established.
A bearer is resumed.
A bearer is released.
A bearer is suspended.

In an example embodiment, the bearer is a bearer corresponding to an MBS ID associated with the first bearer configuration information and includes one or more of the following:

in a case where the first bearer configuration information is associated with bearer ID information, a bearer corresponding to the bearer ID information;

in a case where the first bearer configuration information is associated with an MBS service ID, a bearer corresponding to the MBS service ID; or in a case where the first bearer configuration information is associated with an MBS session ID, a bearer corresponding to the MBS session.

In an example embodiment, the operation where the PTP bearer is suspended includes one or more of the following operations.

The transmission of the bearer is suspended.
A PDCP entity of the bearer is suspended.
A radio link control (RLC) entity of the bearer is suspended.
A MAC entity suspends a logical channel of the bearer or drops data of the logical channel.
A preset entity drops the MBS data.

The preset entity includes one or more of the following: the RLC entity of the bearer, the PDCP entity of the bearer, or a service data adaptation protocol (SDAP) entity associated with the bearer.

In an example embodiment, the operation where the PTM bearer is suspended includes one or more of the following operations.

A MAC layer stops listening to a physical downlink control channel of a radio network temporary ID which corresponds to the MBS ID and is used for a multicast/broadcast service.

The transmission of the bearer is suspended.
A PDCP entity of the bearer is suspended.
An RLC entity of the bearer is suspended.
A MAC entity suspends a logical channel of the bearer or drops data of the logical channel.
A preset entity drops the MBS data.

The preset entity includes one or more of the following: the RLC entity of the bearer, the PDCP entity of the bearer, or an SDAP entity associated with the bearer.

In the preceding embodiments, the operation where the transmission of the bearer is suspended may be understood as that the transmission of the bearer stops.

In the preceding embodiments, when the preset entity is the PDCP entity of the bearer, the MBS data is a PDCP protocol data unit (PDU) and/or a PDCP service data unit (SDU) of the bearer.

When the preset entity is the RLC entity of the bearer, the MBS data is a PDCP PDU and/or an RLC PDU and/or an RLC SDU of the bearer.

When the preset entity is a MAC entity, the MBS data is an RLC PDU and/or a MAC PDU and/or a MAC SDU of the bearer.

In an example embodiment, the operation where the RLC entity is suspended includes one or more of the following operations.

A receiving RLC entity transmits all stored RLC SDUs and/or RLC SDU segments to an upper layer.

A transmitting RLC entity drops all stored RLC PDUs.

The RLC entity stops and resets all timers.

The RLC entity sets all state variables to an initial value.

In an example embodiment, the operation where the PDCP entity is suspended includes one or more of the following operations.

A transmitting PDCP entity sets TX_NEXT to an initial value; the transmitting PDCP entity drops all stored PDCP PDUs.

In a case where t-Reordering operates, a receiving PDCP entity stops and resets the t-Reordering, decompresses all stored PDCP SDU headers, and delivers the decompressed PDCP SDU headers to an upper layer in ascending order of the associated COUNT values.

The receiving PDCP entity sets RX_NEXT and RX_DELIV to an initial value.

It is to be noted that the TX_NEXT state variable indicates the count value of a next PDCP SDU to be sent, and the initial value is 0.

The receiving PDCP entity should maintain the following state variables:
the RX_NEXT state variable which indicates the count value of the next PDCP SDU expected to be received and has an initial value of 0;
the RX_DELIV state variable which indicates the count value of a first PDCP SDU, and the PDCP SDU is not delivered to an upper layer but is still waiting and has an initial value of 0; and
the t-Reordering which is a timer for detecting the loss of PDCP PDUs.

In an example embodiment, the operation where the bearer is resumed includes one or more of the following actions.

An action of suspending the bearer is revoked.

A PDCP entity of the bearer is resumed.

A MAC entity resumes a logical channel of the bearer.

An RLC entity of the bearer is resumed.

The MAC entity transmits data of the logical channel to an upper layer or a lower layer.

The bearer is initiated or used to receive the MBS data.

In an example embodiment, the operation where the PTM bearer is resumed includes the following operations.

A MAC layer initiates or resumes listening to a radio network temporary ID which corresponds to the MBS ID and is used for a multicast/broadcast service.

The PTM bearer is initiated or used to receive the MBS data.

In an example embodiment, the mode configuration method further includes the following operation: second information is sent to the second communication node, where the second information includes: an MBS ID list and a mode used by the first communication node to receive data corresponding to an MBS ID.

This embodiment provides a method for a UE to notify a base station of which mode to be used to receive the MBS ID.

A UE sends second information to a base station, where the second information includes: an MBS ID list and a mode used by the UE to receive an MBS ID. The second information may be carried in an uplink MAC CE or RRC message. The second information indicates that the UE is using or will use a PTP bearer or a PTM bearer to receive data corresponding to the MBS ID. The MBS bearer ID includes one or more of the following: an MBS session ID, an MBS service ID, a QoS flow ID, or a bearer ID. The bearer ID includes one or more of the following: a bearer ID, a mode indication, a DRB ID, a multicast bearer ID, or a broadcast bearer ID, and the MBS ID index may uniquely index one MBS ID.

If the second information indicates that the UE selects the PTM mode to receive the data corresponding to the MBS ID, the base station does not send the MBS data in the corresponding PTP bearer.

If the second information indicates that the UE selects the PTP mode to receive the data corresponding to the MBS ID, the base station sends the MBS data in the corresponding PTP bearer.

If the bearer mode configuration indicates that the UE selects the PTP mode and the PTM mode to receive the data corresponding to the MBS ID, the UE receives the related MBS data through a corresponding PTP RB and a corresponding PTM RB.

The corresponding PTP RB is a PTP RB associated with the corresponding MBS ID, and the corresponding PTM RB is a PTM RB associated with the corresponding MBS ID.

It is to be noted that the UE receives the corresponding MBS data using one mode, which includes the following three cases.

Third mode indication information is associated with a bearer, and the corresponding MBS data is the data corresponding to the QoS flow associated with the corresponding bearer.

Third mode indication information is associated with an MBS service ID, and the corresponding MBS data is the data corresponding to the corresponding MBS service ID.

Third mode indication information is associated with an MBS session ID, and the MBS data is the data corresponding to the corresponding MBS session.

Figure 2A:
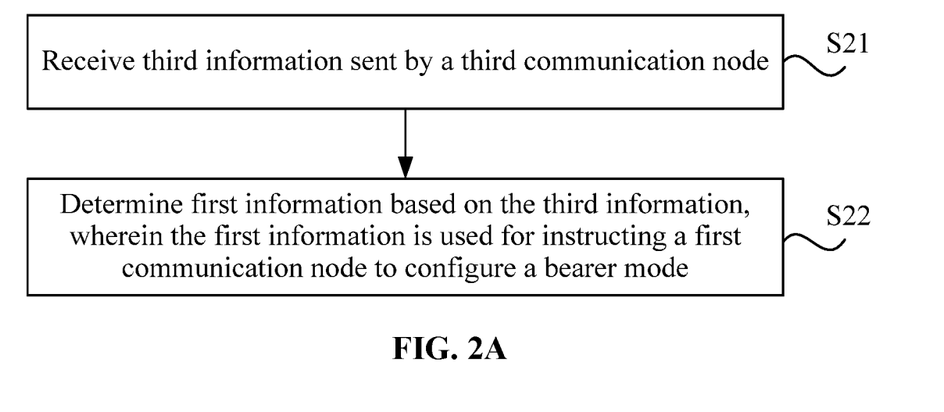
FIG. 2A is a flowchart of a mode configuration method according to an embodiment of the present application.

In an embodiment, the present application provides a mode configuration method. FIG. 2A is a flowchart of a mode configuration method according to an embodiment of the present application. The method may be applied to the case where a CU and a DU in a base station perform bearer mode management. This method may be executed by a mode configuration apparatus provided by the present application, and the mode configuration apparatus may be implemented by software and/or hardware. The method is applied to a second communication node.

As shown in FIG. 2A, the mode configuration method provided by the present application mainly includes S21 and S22.

In S21, third information sent by a third communication node is received.

In S22, first information is determined based on the third information, where the first information is used for instructing a first communication node to configure a bearer mode.

In an example embodiment, the third information includes one or more of the following: an F1 interface MBS ID, MBS session ID information, MBS service ID information, a list of UEs joining an MBS session or service, a UE ID, a bearer ID, or third mode indication information.

The third mode indication information indicates a mode used by the UE to receive the MBS data.

The third mode indication information is associated with one or more of the following: an F1 interface MBS ID, MBS session ID information, MBS service ID information, a list of UEs joining an MBS session or service, a UE ID, or a bearer ID.

In an example embodiment, in a case where the second communication node is a CU, the third communication node is a DU; and in a case where the second communication node is a DU, the third communication node is a CU.

In an example embodiment, the third information is carried by MBS-specific F1AP signalling, UE-specific F1AP signalling or Non-UE specific F1AP signalling.

In an example embodiment, the method further includes the following operation.

The bearer mode is configured based on the third information.

In an example embodiment, the operation where the bearer mode is configured based on the third information includes one or more of the following operations.

In a case where the third mode indication information indicates that none of the UEs use a PTM bearer to receive MBS data, the PTM bearer is suspended.

In a case where the third mode indication information indicates that none of the UEs use a PTP bearer to receive MBS data, the PTP bearer is suspended.

In an example embodiment, the operation where the PTM bearer is suspended or the PTP bearer is suspended includes the following operations.

A MAC entity suspends a logical channel of the bearer or drops data of the logical channel.

An RLC entity of the bearer drops the MBS data.

In an example embodiment, in a case where the second communication node is a DU in a base station, the first information is determined by third information received by the DU, and the third information is sent to the DU by a CU in the base station.

The CU sends the third mode indication information to the DU. Embodiments are as follows:

The DU receives third information from the CU, where the third information includes one or more of the following: an F1 interface MBS ID, an MBS session ID, MBS service ID information, and a list of UEs joining an MBS session or service. Each UE includes one or more of the following: a UE ID, a bearer ID, or third mode indication information. The third mode indication information indicates a mode used by the UE to receive the MBS data, and the mode includes a PTP mode, a PTM mode, or a PTP and a PTM mode.

The third information may be carried by MBS-specific FLAP signalling, UE-specific F1AP signalling or Non-UE specific F1AP signalling.

If the third information indicates that none of UEs use the PTM mode to receive the MBS data, a gNB-DU suspends a corresponding PTM bearer. The action of suspending the PTM bearer includes: a MAC entity suspends a logical channel of the bearer or drops data of the logical channel; and an RLC entity of the bearer drops the MBS data; where the preset entity includes one or more of the following: a MAC entity or an RLC entity.

If the third information indicates that one UE does not use the PTP mode to receive the MBS data, the UE suspends a corresponding PTP bearer, and a gNB-DU suspends the PTP bearer. The action of suspending the PTP bearer includes: a MAC entity suspends a logical channel of the bearer or drops data of the logical channel; and an RLC entity of the bearer drops the MBS data; where the preset entity includes one or more of the following: a MAC entity or an RLC entity.

It is to be noted that the UE receives the corresponding MBS data using one mode, which includes the following three cases.

The third mode indication information is associated with a bearer, and the corresponding MBS data is the data corresponding to the QoS flow associated with the corresponding bearer.

The third mode indication information is associated with an MBS service ID, and the corresponding MBS data is the data corresponding to the corresponding MBS service ID.

The third mode indication information is associated with an MBS session ID, and the corresponding MBS data is the data corresponding to the corresponding MBS session.

In an applicable embodiment, the first information is MAC CE information sent by a DU to a UE. This embodiment provides an indication manner of the following mode indication information.

The indication manner through a MAC CE of a fixed length mainly includes as follows.

Embodiment: The MAC CE includes a first mode indication Mi or a second mode indication Ni corresponding to an MBS ID index i. The MBS ID index i is sorted according to the magnitude of the MBS ID, and i represents an $i^{th}$ MBS ID that a UE is receiving, receives, receives using a PTP mode or receives using a PTM mode. The MAC CE is of a fixed length of n bytes and corresponds to 8×n MBS IDs.

The first mode indication information is used for indicating a mode to be used for receiving the data corresponding to the MBS ID, and the value and the meaning of Mi include one or more of the following cases.

Mi takes a first value and represents that the UE is instructed to receive the data corresponding to the $i^{th}$ MBS ID using the PTP mode.

Mi takes a second value and represents that the UE is instructed to receive the data corresponding to the $i^{th}$ MBS ID using the PTM mode.

Mi takes a third value and represents that the UE is instructed to receive the data corresponding to the $i^{th}$ MBS ID using the PTP mode and the PTM mode.

Mi takes a fourth value and represents a reserved value.

The values in the first value, the second value, the third value, and the fourth value do not represent the magnitude or the order thereof.

The first bearer configuration information is used for indicating the operation or state of receiving the bearer corresponding to the MBS ID, and the value and the meaning of Ni include one or more of the following cases.

Ni takes a first value and represents that the UE is instructed to suspend the bearer corresponding to the $i^{th}$ MBS ID.

Ni takes a second value and represents that the UE is instructed to resume the bearer corresponding to the $i^{th}$ MBS ID.

Ni takes a third value and represents that the UE is instructed to establish the bearer corresponding to the $i^{th}$ MBS ID.

Ni takes a fourth value and represents that the UE is instructed to release the bearer corresponding to the $i^{th}$ MBS ID.

The values in the first value, the second value, the third value, and the fourth value do not represent the magnitude or the order thereof.

It is to be noted that for the operation where the UE configures the bearer according to the first mode indication information or the first bearer configuration information, reference may be made to the specific description in other embodiments of the present application, and details will not be repeated herein.

Figure 3:
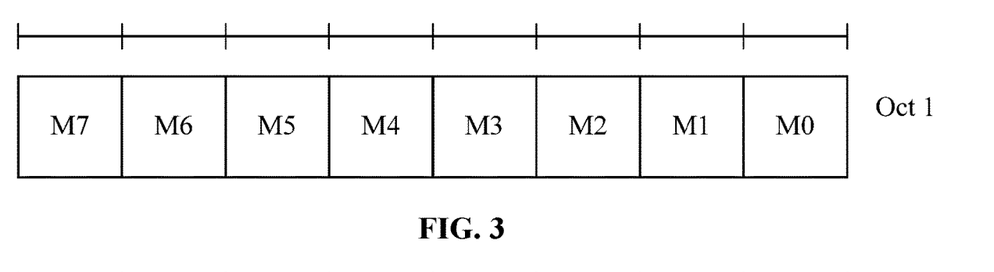
FIG. 3 is a schematic diagram of a media access control control element (MAC CE)

Manner 1: FIG. 3 is a schematic diagram of a MAC CE. As shown in FIG. 3, Mi represents that the UE is receiving or receives using the PTP mode an $i^{th}$ MBS session (the MBS session is sorted according to the MBS session ID or sorted according to the magnitude of the temporary mobile group identity (TMGI)). The MAC CE is of a fixed length of n bytes and corresponds to 8×n sessions. Herein, n is equal to 1 for illustration, and n may also be 2, 3 or 4.

Mi is 0 and represents that the UE receives the data corresponding to the $i^{th}$ MBS session (or the TMGI) using the PTP mode.

Mi is 1 and represents that the UE receives the data corresponding to the $i^{th}$ MBS session (or the TMGI) using the PTM mode. Optionally, the UE may perform one or more of the following actions: the UE receives a PTM RB configuration of the $i^{th}$ MBS session; the UE establishes a PTM RB; or the UE releases all PTP RBs associated with the $i^{th}$ MBS session.

Figure 4:
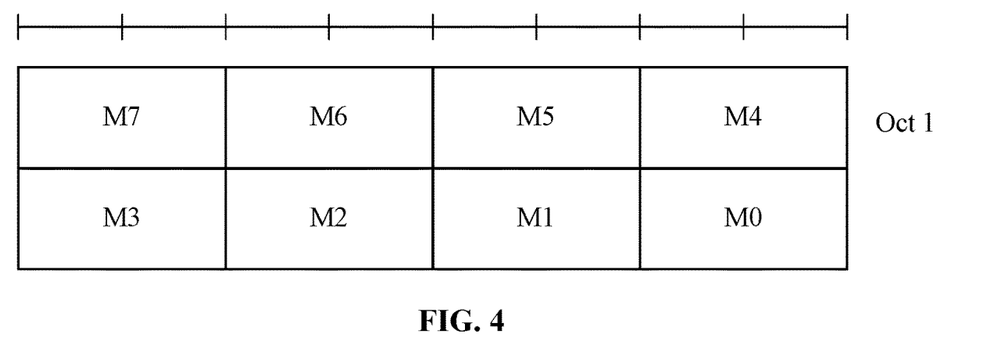
FIG. 4 is a schematic diagram of a MAC CE.

Manner 2: FIG. 4 is a schematic diagram of a MAC CE. As shown in FIG. 4, Mi represents that the UE is receiving or receives using the PTP mode an $i^{th}$ MBS session (the MBS session is sorted according to the MBS session ID or sorted according to the magnitude of the TMGI). The MAC CE is of a fixed length of n bytes and corresponds to 4×n sessions. Herein, n is equal to 2 for illustration, and n may also be any number from 1 to 8.

Mi is 00 and represents that the UE receives the data corresponding to the $i^{th}$ MBS session (or the TMGI) using the PTP mode.

Mi is 01 and represents that the UE receives the data corresponding to the $i^{th}$ MBS session (or the TMGI) using the PTM mode. Optionally, the UE may perform one or more of the following actions: the UE receives a PTM RB configuration of the $i^{th}$ MBS session; the UE establishes a PTM RB; or the UE releases all PTP RBs associated with the $i^{th}$ MBS session.

Mi is 10 and represents that the UE receives the data corresponding to the $i^{th}$ MBS session (or the TMGI) using the PTP+PTM mode. Optionally, the UE may perform one or more of the following actions: the UE receives a PTM RB configuration of the $i^{th}$ MBS session; the UE establishes a PTM RB; or the UE reserves all PTP RBs associated with the $i^{th}$ MBS session.

Mi is 11 and is a reserved value.

Figure 5:
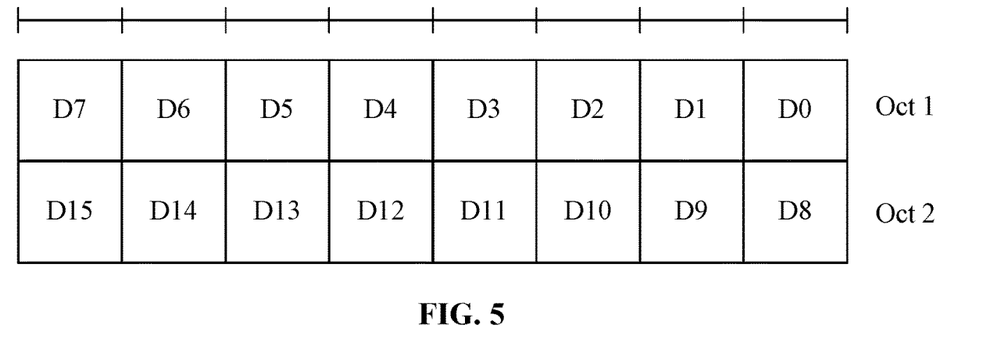
FIG. 5 is a schematic diagram of a MAC CE.

Manner 3: FIG. 5 is a schematic diagram of a MAC CE. As shown in FIG. 5, Di represents that the UE is receiving or receives using the PTP mode an $i^{th}$ DRB (the DRB is sorted according to the DRB ID) of an MBS service. The MAC CE is of a fixed length of n bytes and corresponds to 8×n DRBs. Herein, n is equal to 2 for illustration, and n may also be 1, 3 or 4.

Di is set to 0 and represents that the UE is instructed to receive the QoS flow data corresponding to the $i^{th}$ DRB using the PTP mode.

Di is set to 1 and represents that the UE is instructed to receive the QoS flow data corresponding to the $i^{th}$ DRB using the PTM mode. Optionally, the UE may perform one or more of the following actions: the UE establishes a PTM RB corresponding to the QoS flow corresponding to the $i^{th}$ DRB; or the UE releases an $i^{th}$ PTP DRB.

It is to be noted that, optionally, Dis corresponding to the RBs corresponding to one MBS ID must have the same value.

Figure 6:
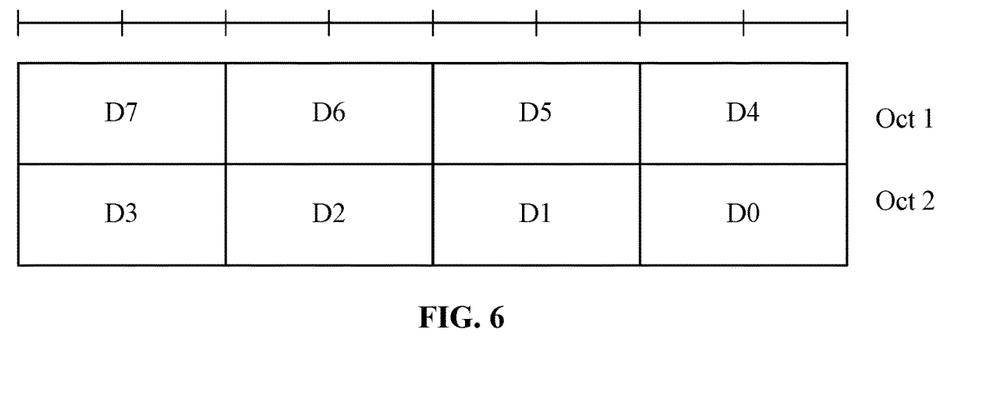
FIG. 6 is a schematic diagram of a MAC CE.

Manner 4: FIG. 6 is a schematic diagram of a MAC CE. As shown in FIG. 6, Di represents that the UE is receiving or receives using the PTP mode an $i^{th}$ DRB (the DRB is sorted according to the DRB ID) of an MBS service. The MAC CE is of a fixed length of n bytes and corresponds to 4×n DRBs. Herein, n is equal to 2 for illustration, and n may also be any number from 1 to 8.

Di is set to 00 and represents that the UE is instructed to receive the MBS QoS flow data corresponding to the $i^{th}$ DRB using the PTP mode.

Di is set to 01 and represents that the UE is instructed to receive the QoS flow data corresponding to the $i^{th}$ DRB using the PTM mode. Optionally, the UE may perform one or more of the following actions: the UE establishes a PTM RB corresponding to the MBS QoS flow corresponding to the $i^{th}$ DRB; or the UE releases an $i^{th}$ PTP DRB.

Di is set to 10 and represents that the UE is instructed to receive the QoS flow data corresponding to the $i^{th}$ DRB using the PTP mode and the PTM mode. Optionally, the UE may perform one or more of the following actions: the UE establishes a PTM RB corresponding to the MBS QOS flow corresponding to the $i^{th}$ DRB; or the UE reserves an $i^{th}$ PTP DRB.

Di is set to 11 and is a reserved value.

Optionally, Dis corresponding to the DRBs corresponding to one MBS session must have the same value.

The indication manner through a MAC CE of a variable length mainly includes as follows.

Figure 7:
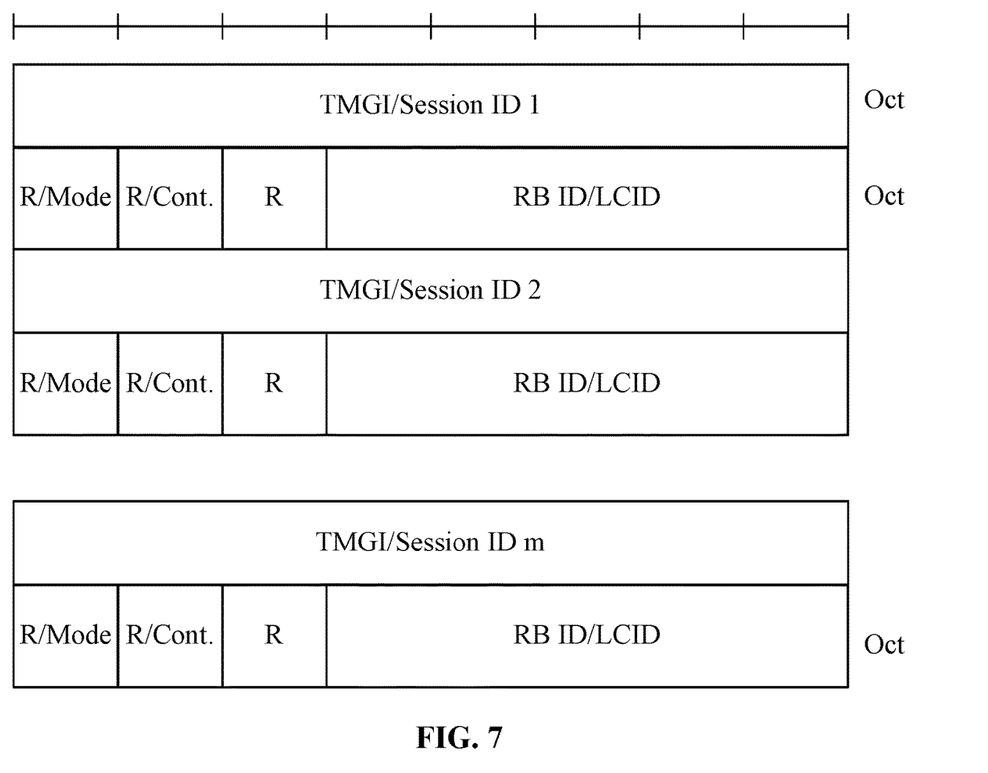
FIG. 7 is a schematic diagram of a MAC CE.

Embodiment: FIG. 7 is a schematic diagram of a MAC CE. As shown in FIG. 7, the MAC CE includes one or more of the following: mode indication information (Mode), an MBS ID or an index thereof, an RB ID or an index thereof, or a logical channel ID (LCID) or an index thereof.

In an embodiment, the Mode is first mode indication information which is used for indicating a mode to be used for receiving the data corresponding to the MBS ID, and the value and the meaning of Mode include one or more of the following cases.

Mode i takes a first value and represents that the UE is instructed to receive the data corresponding to the $i^{th}$ MBS ID using the PTP mode.

Mode i takes a second value and represents that the UE is instructed to receive the data corresponding to the $i^{th}$ MBS ID using the PTM mode.

Mi takes a third value and represents that the UE is instructed to receive the data corresponding to the $i^{th}$ MBS ID using the PTP mode and the PTM mode.

Mode i takes a fourth value and represents a reserved value.

The values in the first value, the second value, the third value, and the fourth value do not represent the magnitude or the order thereof.

In an embodiment, the Mode is first bearer configuration information which is used for indicating the operation or state of receiving the bearer corresponding to the MBS ID, and the value and the meaning of Mode include one or more of the following cases.

Mode i takes a first value and represents that the UE is instructed to suspend the bearer corresponding to the $i^{th}$ MBS ID.

Mode i takes a second value and represents that the UE is instructed to resume the bearer corresponding to the $i^{th}$ MBS ID.

Mode i takes a third value and represents that the UE is instructed to establish the bearer corresponding to the $i^{th}$ MBS ID.

Mode i takes a fourth value and represents that the UE is instructed to release the bearer corresponding to the $i^{th}$ MBS ID.

The values in the first value, the second value, the third value, and the fourth value do not represent the magnitude or the order thereof.

In an embodiment, one Mode is associated with one MBS ID. In an embodiment, one Mode is associated with one bearer ID. In an embodiment, one Mode is associated with one LCID. In an embodiment, one Mode is associated with one or more of one MBS ID, one bearer ID, or one LCID.

Optionally, Modes corresponding to the DRBs corresponding to one MBS session ID or one MBS service ID must have the same value.

It is to be noted that for the operation where the UE configures the bearer according to the first mode indication information or the first bearer configuration information, reference may be made to the specific description in other embodiments of the present application, and details will not be repeated herein.

The MAC CE of a variable length is designed in the following manners.

Figure 8:
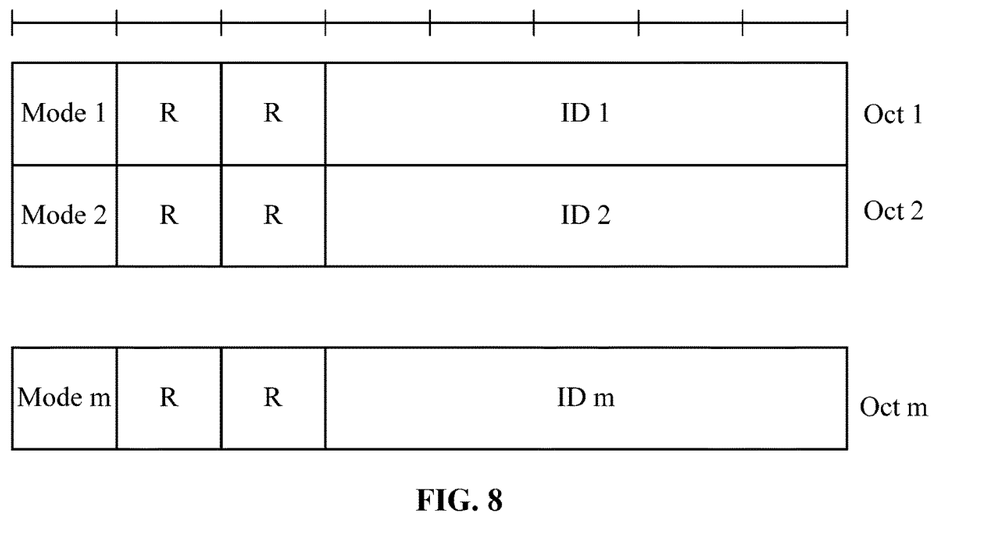
FIG. 8 is a schematic diagram of a MAC CE.

Manner 1: FIG. 8 is a schematic diagram of a MAC CE. As shown in FIG. 8, ID i represents an $i^{th}$ PTP DRB ID or an LCID in the MAC CE. Mode i indicates a mode transformation instruction of an $i^{th}$ DRB, and Mode i occupies 1 byte. The MAC CE is of a variable length.

Mode i is set to 0 and represents that the UE is instructed to receive the QoS flow data corresponding to the $i^{th}$ DRB using the PTM mode. Optionally, the UE may perform one or more of the following actions: the UE establishes a PTM RB corresponding to the QoS flow corresponding to the $i^{th}$ DRB; or the UE releases the $i^{th}$ DRB.

Mode i is set to 1 and represents that the UE is instructed to receive the QoS flow data corresponding to the $i^{th}$ DRB using the PTP mode and the PTM mode. Optionally, the UE may perform one or more of the following actions: the UE establishes a PTM RB corresponding to the QoS flow corresponding to the $i^{th}$ DRB; or the UE does not release the $i^{th}$ DRB.

Figure 9:
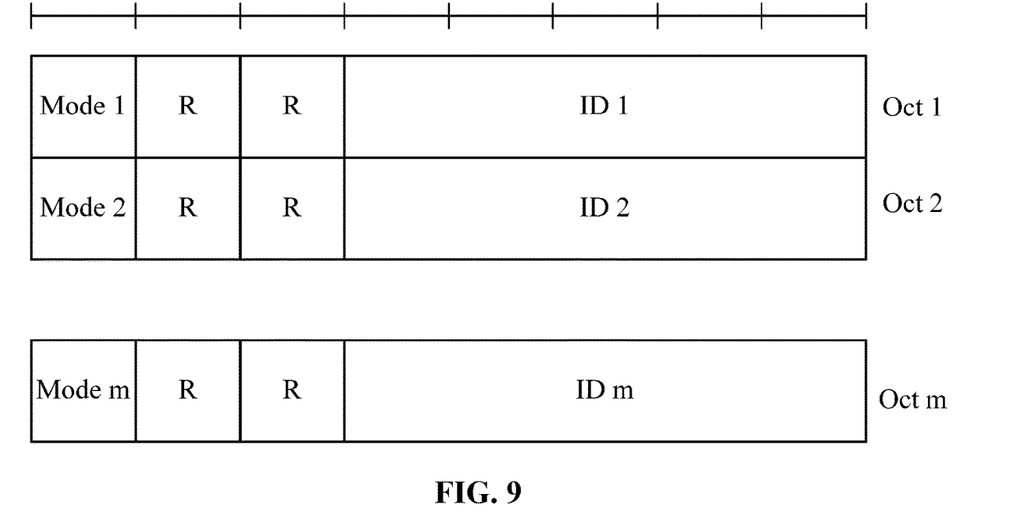
FIG. 9 is a schematic diagram of a MAC CE.

Manner 2: FIG. 9 is a schematic diagram of a MAC CE. As shown in FIG. 9, ID i represents an $i^{th}$ PTP DRB ID or an LCID in the MAC CE. Mode i indicates a mode transformation instruction of an $i^{th}$ DRB, and Mode i occupies 2 bytes. The MAC CE is of a variable length.

Mode i is set to 00 and represents that the UE is instructed to receive the QoS flow (Session ID+QoS flow identifier (QFI)) data corresponding to the $i^{th}$ DRB using the PTP mode.

Mode i is set to 01 and represents that the UE is instructed to receive the QoS flow data corresponding to the $i^{th}$ DRB using the PTM mode. That is, the UE is instructed to establish a PTM RB corresponding to the QoS flow corresponding to the $i^{th}$ DRB and release the $i^{th}$ DRB.

Mode i is set to 10 and represents that the UE is instructed to receive the QoS flow data corresponding to the $i^{th}$ DRB using the PTP+PTM mode. That is, the UE is instructed to establish a PTM RB corresponding to the QoS flow corresponding to the $i^{th}$ DRB and reserve the $i^{th}$ DRB.

Mode i is set to 11 and is a reserved value.

Optionally, Modes corresponding to the DRBs corresponding to one MBS session must have the same value.

Figure 10:
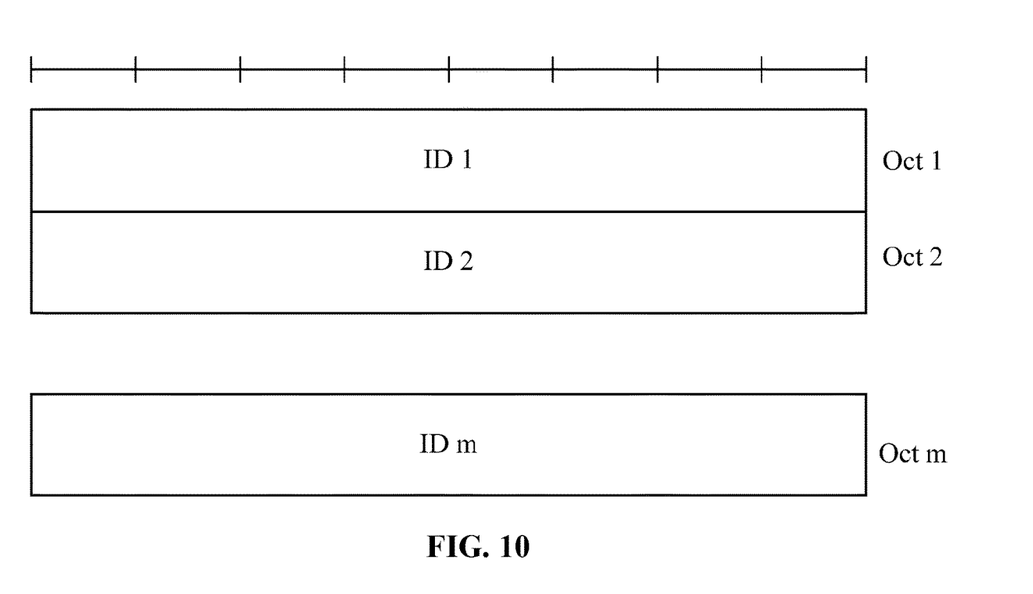
FIG. 10 is a schematic diagram of a MAC CE.

Manner 3: FIG. 10 is a schematic diagram of a MAC CE. As shown in FIG. 10, ID i represents an $i^{th}$ MBS session ID (1 byte) or a TMGI (5 to 8 bytes, where the Service ID of 3 bytes may be selected) in the MAC CE. The LCID of the MAC CE represents that the mode corresponding to all MBS IDs in the MAC CE needs to be switched from the PTP mode to the PTM mode. The UE needs to perform one or more of the following operations: the UE establishes a PTM RB of an MBS ID; or the UE releases a PTP RB. The MAC CE is of a variable length.

Manner 4: As shown in FIG. 10, ID i represents an $i^{th}$ MBS session ID (1 byte) or a TMGI (5 to 8 bytes, where the Service ID of 3 bytes may be selected) in the MAC CE. The LCID of the MAC CE represents that the mode corresponding to all MBS IDs in the MAC CE needs to be switched from the PTP mode to the PTP mode and the PTM mode. The UE needs to perform one or more of the following operations: the UE establishes a PTM RB of an MBS ID; or the UE reserves a PTP RB. The MAC CE is of a variable length.

Manner 5: As shown in FIG. 10, ID i represents an $i^{th}$ MBS session ID (1 byte) or a TMGI (5 to 8 bytes, where the Service ID of 3 bytes may be selected) in the MAC CE. The LCID of the MAC CE represents that the mode corresponding to all MBS IDs in the MAC CE needs to be switched from the PTM mode to the PTP mode. The UE needs to perform one or more of the following operations: the UE establishes a PTP RB of an MBS ID; or the UE releases a PTM RB of an MBS ID. The MAC CE is of a variable length.

In an embodiment, the MAC CE may be broadcast to a group of UEs or UEs in a cell. In another embodiment, the MAC CE may be unicast to one UE.

In an applicable embodiment, how the UE switches from one mode RB to another mode RB is described below from the perspective of the user plane.

1) The PTP mode is switched to the PTM mode.

When the PTP is in a UM mode, the UE delivers the received data of the RLC/PDCP to an upper layer, establishes a PTM bearer, and initiates the PTM reception. The DRB of the PTP may be released according to the requirements of a control plane (switch instruction).

When the DRB of the PTP is in an RLC AM mode, the CU may initiate the PDCP resumption process corresponding to the DRB, trigger the UE to report a PDCP state report, and retransmit the PDCP PDU which is not received by the UE. Meanwhile, the CU sends a PTM reception indication to the UE to initiate the UE to establish/use a PTM bearer for PTM reception.

2) The PTM mode is switched to the PTP mode.

The UE delivers the received data of the RLC/PDCP to an upper layer, establishes a PTP bearer, and initiates the PTP reception. The DRB of the PTM may be released according to the requirements of the control plane (switch instruction).

3) The PTP mode and the PTM mode are switched to the PTP mode or the PTM mode.

The UE delivers the received data of the RLC/PDCP to an upper layer and performs the release operation on a PTP RB or a PTM RB according to the requirements of the control plane (switch instruction).

Figure 11:
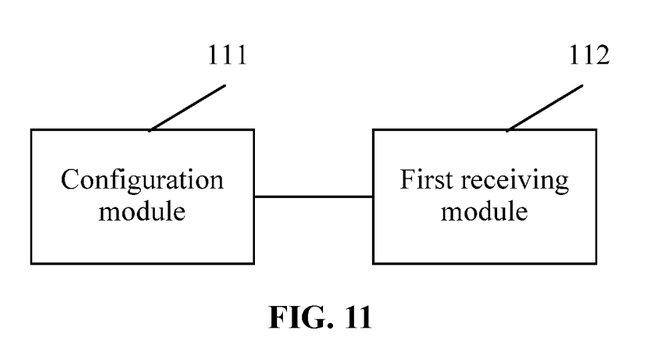
FIG. 11 is a structure diagram of a mode configuration apparatus according to an embodiment of the present application.

In an embodiment, the present application provides a mode configuration apparatus. FIG. 11 is a structure diagram of a mode configuration apparatus according to an embodiment of the present application. The apparatus may be applied to the case where a UE switches from one RB mode to another RB mode. The mode configuration apparatus may be implemented by software and/or hardware, and the method is applied to a UE.

As shown in FIG. 11, the mode configuration apparatus provided by this embodiment of the present application mainly includes a configuration module 111 and a first receiving module 112.

The configuration module 111 is configured to receive first information and configure a bearer mode based on the first information.

The first receiving module 112 is configured to receive MBS data using the configured bearer mode.

In an example embodiment, the first information includes one or more of the following: an MBS ID, an MBS ID index, first mode indication information, or first bearer configuration information, where the MBS ID index uniquely indexes one MBS ID.

In an example embodiment, the MBS ID index is sorted according to the magnitude of an MBS ID.

In an example embodiment, in a case where the first information is carried by an RRC message, the first information is sent by a CU; and in a case where the first information is carried by a MAC CE message, the first information is sent by a DU.

In an example embodiment, the MBS ID includes one or more of the following: an MBS session ID, an MBS service ID, a QoS flow ID, or a bearer ID.

The bearer ID includes one or more of the following: a radio bearer ID, a mode indication, a DRB ID, or a multicast/broadcast bearer ID.

In an example embodiment, the first mode indication information is used for indicating a mode to be used for receiving the MBS data.

In an example embodiment, the first receiving module 112 is configured to perform one or more of the following operations.

The MBS data is received using a PTM mode.

The MBS data is received using a PTP mode and a PTM mode.

The MBS data is received using a PTP mode.

In an example embodiment, the configuration mode 111 is configured to, in a case where the first mode indication information indicates that the MBS data is received using the PTM mode, perform one or more of the following operations.

A PTM bearer is established.

A PTM bearer is resumed.

In an example embodiment, the first receiving module 112 is configured to, in a case where the MBS data is being received using a PTP bearer of a UM mode before the first information is received, establish a PTM bearer, and release the PTP bearer; or in a case where the MBS data is being received using a PTP radio bearer of a UM mode before the first information is received, resume a PTM bearer, and suspend a PTP bearer.

In an example embodiment, the configuration module 111 is configured to, in a case where the MBS data is being received using a PTP bearer of an AM mode before the first information is received, send a PDCP state report to the CU, and establish a PTM bearer or resume a PTM bearer.

In an example embodiment, the configuration module 111 is configured to, in a case where the MBS data is being received using a PTP mode and a PTM mode before the first information is received, release a PTP bearer or suspend a PTP bearer.

In an example embodiment, the configuration module 111 is configured to, in a case where the first mode indication information indicates that the MBS data is received using a PTP mode, configure the bearer mode based on the first information and perform one or more of the following operations.

A PTP bearer is established.

A PTP bearer is resumed.

In an example embodiment, the configuration module 111 is configured to, in a case where the MBS data is being received using a PTM bearer before the first information is received, establish a PTP bearer, and release the PTM bearer; or in a case where the MBS data is being received using a PTM bearer before the first information is received, resume a PTP bearer, and suspend the PTM bearer.

In an example embodiment, the configuration module 111 is configured to, in a case where the MBS data is being received using a PTP mode and a PTM mode before the first information is received, release a PTM bearer or suspend a PTM bearer.

In an example embodiment, the configuration module 111 is configured to, in a case where the first mode indication information indicates that the MBS data is received using the PTP mode and the PTM mode, configure the bearer mode based on the first information and perform one or more of the following operations.

In a case where the MBS data is being received using a PTM bearer before the first information is received, establish a PTP bearer or resume a PTP bearer.

In a case where the MBS data is being received using a PTP bearer before the first information is received, establish a PTM bearer or resume a PTM bearer.

In an example embodiment, the first bearer configuration is used for instructing the configuration module 111 to perform one or more of the following operations.

A bearer is established.

A bearer is resumed.

A bearer is released.

A bearer is suspended; where the bearer being suspended includes: a PTP bearer is suspended or a PTM bearer is suspended.

In an example embodiment, the PTP bearer being suspended includes one or more of the following operations.

The transmission of the bearer is suspended.

A PDCP entity of the bearer is suspended.

An RLC entity of the bearer is suspended.

A MAC entity suspends a logical channel of the bearer or drops data of the logical channel.

A preset entity drops the MBS data.

The preset entity includes one or more of the following: the RLC entity of the bearer, the PDCP entity of the bearer, or an SDAP entity associated with the bearer.

In an example embodiment, the operation where the PTM bearer is suspended includes one or more of the following operations.

A MAC layer stops listening to a physical downlink control channel of a radio network temporary identifier which corresponds to the MBS ID and which is used for a multicast/broadcast service.

The transmission of the bearer is suspended.

A PDCP entity of the bearer is suspended.

An RLC entity of the bearer is suspended.

A MAC entity suspends a logical channel of the bearer or drops data of the logical channel.

A preset entity drops the MBS data.

The preset entity includes one or more of the following: the RLC entity of the bearer, the PDCP entity of the bearer, or an SDAP entity associated with the bearer.

In an example embodiment, the operation where the RLC entity is suspended includes one or more of the following operations.

A receiving RLC entity transmits all stored RLC SDUs and/or RLC SDU segments to an upper layer.

A transmitting RLC entity drops all stored RLC PDUs.

The RLC entity stops and resets all timers.

The RLC entity sets all state variables to an initial value.

In an example embodiment, the operation where the bearer is resumed includes one or more of the following actions.

An action of suspending the bearer is revoked.

A PDCP entity of the bearer is resumed.

A MAC entity resumes a logical channel of the bearer.

The MAC entity transmits data of the logical channel to an upper layer or a lower layer.

The bearer is initiated or used to receive the MBS data.

In an example embodiment, the operation where the PTM bearer is resumed includes the following operation.

A MAC layer initiates or resumes listening to a radio network temporary identifier which corresponds to the MBS ID and which is used for a multicast/broadcast service.

The mode configuration apparatus provided by this embodiment can execute the mode configuration method provided by any of the embodiments of the present application and has functional modules and effects corresponding to the executed method. For technical details that are not described in detail in this embodiment, reference may be made to the mode configuration method provided by any of the embodiments of the present application.

It is to be noted that units and modules involved in the embodiments of the mode configuration apparatus are divided according to functional logic, and the division is not limited to this, as long as the corresponding functions can be implemented. In addition, the specific names of functional units are intended to distinguish and not to limit the scope of the present application.

Figure 11A:
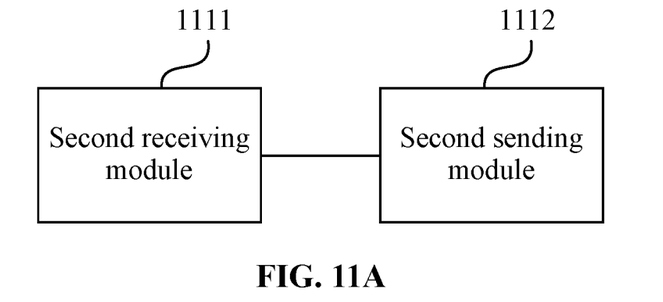
FIG. 11A is a structure diagram of a mode configuration apparatus according to an embodiment of the present application.

In an embodiment, the present application provides a mode configuration apparatus. FIG. 11A is a structure diagram of a mode configuration apparatus according to an embodiment of the present application. The apparatus may be applied to the case where a CU and a DU in a base station perform bearer mode management. The mode configuration apparatus may be implemented by software and/or hardware, and the apparatus is applied to a base station.

As shown in FIG. 11A, the mode configuration apparatus provided by the present application mainly includes a second receiving module 1111 and a second sending module 1112.

The second receiving module 1111 is configured to receive third information sent by a third communication node.

The second sending module 1112 is configured to determine first information based on the third information and send the first information to a first communication node, where the first information is used for instructing the first communication node to configure a bearer mode.

In an example embodiment, the third information includes one or more of the following: an F1 interface MBS ID, MBS session ID information, MBS service ID information, a list of UEs joining an MBS session or service, a UE ID, a bearer ID, or third mode indication information.

In an example embodiment, in a case where the second communication node is a CU, the third communication node is a DU; and in a case where the second communication node is a DU, the third communication node is a CU.

The third mode indication information indicates a mode used by the UE to receive the MBS data.

In an example embodiment, the third information is carried by MBS-specific F1AP signalling, UE-specific F1AP signalling or Non-UE specific F1AP signalling.

In an example embodiment, the apparatus further includes a second configuration module. The second configuration module is configured to configure a bearer mode based on the third information.

In an example embodiment, the second configuration module is configured to perform one or more of the following operations.

In a case where the third mode indication information indicates that none of UEs use a PTM bearer to receive MBS data, suspend the PTM bearer.

In a case where the third mode indication information indicates that none of all UEs use a PTP bearer to receive MBS data, suspend the PTP bearer.

In an example embodiment, the operation where the PTM bearer is suspended or the PTP bearer is suspended includes the following operations.

A MAC entity suspends a logical channel of the bearer or drops data of the logical channel.

An RLC entity of the bearer drops the MBS data.

The mode configuration apparatus provided by this embodiment can execute the mode configuration method provided by any of the embodiments of the present application and has functional modules and effects corresponding to the executed method. For technical details that are not described in detail in this embodiment, reference may be made to the mode configuration method provided by any of the embodiments of the present application.

It is to be noted that units and modules involved in the embodiments of the mode configuration apparatus are divided according to functional logic, and the division is not limited to this, as long as the corresponding functions can be implemented. In addition, the specific names of functional units are intended to distinguish and not to limit the scope of the present application.

Figure 12:
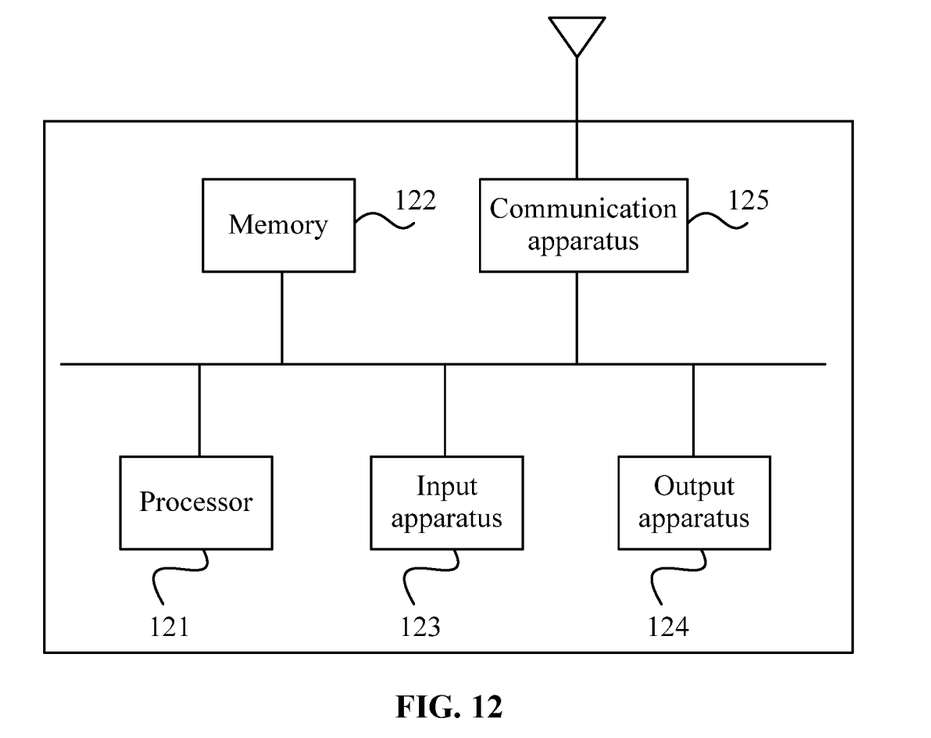
FIG. 12 is a structure diagram of a device according to an embodiment of the present application.

An embodiment of the present application further provides a device. FIG. 12 is a structure diagram of a device according to an embodiment of the present application. As shown in FIG. 12, the device includes a processor 121, a memory 122, an input apparatus 123, an output apparatus 124 and a communication apparatus 125. The number of processors 121 in the device may be one or more, and one processor 121 is illustrated in FIG. 12. The processor 121, the memory 122, the input apparatus 123 and the output apparatus 124 in the device may be connected to each other via a bus or in other ways, and the connection via a bus is illustrated in FIG. 12.

As a computer-readable storage medium, the storage device 122 may be configured to store software programs, computer-executable programs and modules such as program instructions/modules corresponding to the mode configuration method described in the embodiments of the present application (for example, the configuration module 111 and the first receiving module 112 in the mode configuration apparatus) or program instructions/modules corresponding to the mode configuration method described in the embodiments of the present application (for example, the second receiving module 1111 and the second sending module 1112 in the mode configuration apparatus). The processor 121 runs the software programs, instructions and modules stored in the memory 122 to perform function applications and data processing of the device, that is, to implement any of the methods provided by the embodiments of the present application.

The memory 122 may mainly include a program storage region and a data storage region, where the program storage region may store an operating system and an application program required by at least one function while the data storage region may store data created depending on the use of the device. In addition, the memory 122 may include a high-speed random-access memory and may also include a non-volatile memory such as at least one disk memory, flash memory or another non-volatile solid-state memory. In some examples, the memory 122 may further include memories located remotely relative to the processor 121, and these remote memories may be connected to the device via a network. Examples of the preceding network include, but are not limited to, the Internet, an intranet, a local area network, a mobile communication network, and a combination thereof.

The input apparatus 123 may be used for receiving inputted digital or character information and for generating soft key signal input related to user settings and function control of the device. The output apparatus 124 may include a display screen and other display devices.

The communication apparatus 125 may include a receiver and a transmitter. The communication apparatus 125 is configured to perform information transceiving and communication under the control of the processor 121.

It is to be noted that in a case where the device is the first communication node, the processor 121 executes programs stored in the memory 122 to perform a variety of function applications and data processing, for example, to perform a mode configuration method provided by the embodiments of the present application. The method is applied to the first communication node and includes the following operations.

First information is received and a bearer mode is configured based on the first information.

MBS data is received using the configured bearer mode.

It is to be understood by those skilled in the art that the processor 121 may also perform the technical solutions of the mode configuration method provided by any of the embodiments of the present application. For the hardware structure and functions of the device, reference may be made to the content of the embodiments described above.

It is to be noted that in a case where the device is the second communication node, the processor 121 executes programs stored in the memory 122 to perform a variety of function applications and data processing, for example, to perform a mode configuration method provided by the embodiments of the present application. The method includes the following operations.

Third information sent by a third communication node is received.

First information is determined based on the third information, where the first information is used for instructing a first communication node to configure a bearer mode.

It is to be understood by those skilled in the art that the processor 121 may also perform the technical solutions of the mode configuration method provided by any of the embodiments of the present application. For the hardware structure and functions of the device, reference may be made to the content of the embodiments described above.

An embodiment of the present application further provides a storage medium including computer-executable instructions, where the computer-executable instructions are used for, when executed by a computer processor, performing a mode configuration method. The method includes the following operations.

First information is received and a bearer mode is configured based on the first information.

MBS data is received using the configured bearer mode.

In the storage medium including computer-executable instructions provided by the embodiments of the present application, the computer-executable instructions implement not only the operations of the mode configuration method described above but also related operations in the mode configuration method provided by the embodiments of the present application.

An embodiment of the present application further provides a storage medium including computer-executable instructions, where the computer-executable instructions are used for, when executed by a computer processor, performing a mode configuration method. The method includes the following operations.

Third information sent by a third communication node is received.

First information is determined based on the third information, where the first information is used for instructing a first communication node to configure a bearer mode.

In the storage medium including computer-executable instructions provided by the embodiments of the present application, the computer-executable instructions implement not only the operations of the mode configuration method described above but also related operations in the mode configuration method provided by the embodiments of the present application.

From the preceding description of embodiments, it is apparent to those skilled in the art that the present application may be implemented by means of software and necessary general-purpose hardware or may be implemented by hardware. Based on this understanding, the technical solutions of the present application may be embodied in the form of a software product. The computer software product may be stored in a computer-readable storage medium such as a floppy disk, a read-only memory (ROM), a random-access memory (RAM), a flash memory, a hard disk, or an optical disk of a computer and includes multiple instructions for causing a computer device (which may be a personal computer, a server, or a network device) to perform the method in any of the embodiments of the present application.

The preceding are example embodiments of the present application and are not intended to limit the scope of the present application.

It is to be understood by those skilled in the art that the term user terminal encompasses any appropriate type of wireless user devices, such as a mobile phone, a portable data processing apparatus, a portable web browser or a vehicle-mounted mobile station.

In general, multiple embodiments of the present application may be implemented in hardware or special-purpose circuits, software, logic, or any combination thereof. For example, some aspects may be implemented in hardware, while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, such as in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for a local technical environment and may be implemented using any suitable data storage technology. The memory may be, for example, but not limited to, a read-only memory (ROM), a random-access memory (RAM), an optical storage apparatus and system (digital video disk (DVD) or compact disc (CD)) or the like. The computer-readable media may include a non-transitory storage medium. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A mode configuration method, applied by a first communication node and comprising:
   receiving first information and configuring a bearer mode based on the first information; and
   receiving multicast/broadcast service (MBS) data using the configured bearer mode;
   wherein the first information comprises at least one of:
   an MBS identifier, an MBS identifier index, first mode indication information, and first bearer configuration information, wherein the MBS identifier index uniquely indexes one MBS identifier;
   wherein the first mode indication information is used for indicating a mode to be used for receiving the MBS data;
   wherein in a case where the first mode indication information indicates that the MBS data is received using a point-to-multipoint (PTM) mode, the configuring a bearer mode based on the first information comprises at least one of:
   establishing a PTM bearer; or
   resuming a PTM bearer; and
   wherein the resuming a PTM bearer comprises:
   initiating or resuming, by a media access control (MAC) layer, listening to a radio network temporary identifier which corresponds to the MBS identifier and is used for a multicast/broadcast service.

2. The method of claim 1, wherein in a case where the first information is carried by a radio resource control (RRC) message, the first information is sent by a centralized unit; and in a case where the first information is carried by a media access control control element (MAC CE) message, the first information is sent by a distributed unit.

3. The method of claim 1, wherein
   the MBS identifier comprises at least one of:
   an MBS session identifier, an MBS service identifier, a quality of service (QOS) flow identifier, or a bearer identifier;
   the bearer identifier comprises at least one of:
   a radio bearer identifier, a mode indication, a data radio bearer (DRB) identifier, or a multicast/broadcast bearer identifier.

4. The method of claim 1, wherein the receiving MBS data using the configured bearer mode comprises at least one of:
   receiving the MBS data using a point-to-multipoint (PTM) mode;
   receiving the MBS data using a point-to-point (PTP) mode and a PTM mode; or
   receiving the MBS data using a PTP mode.

5. The method of claim 1, further comprising one of the following:
   in a case where the MBS data is being received using a PTP bearer of an unacknowledged mode (UM) before the first information is received, establishing the PTM bearer and releasing the PTP bearer;
   in a case where the MBS data is being received using a PTP radio bearer of a UM mode before the first information is received, resuming the PTM bearer and suspending a PTP bearer;
   in a case where the MBS data is being received using a PTP bearer of an acknowledged mode (AM) before the first information is received, sending a packet data convergence protocol (PDCP) state report to a centralized unit, and establishing the PTM bearer or resuming the PTM bearer; or
   in a case where corresponding MBS data is being received using a PTP mode and the PTM mode before the first information is received, releasing a PTP bearer or suspending a PTP bearer.

6. The method of claim 5, wherein the suspending a PTP bearer comprises at least one of:
   suspending transmission of the bearer;
   suspending a PDCP entity of the bearer;
   suspending a radio link control (RLC) entity of the bearer;
   suspending, by a MAC entity, a logical channel of the bearer or dropping data of the logical channel; or
   dropping, by a preset entity, corresponding MBS data;
   wherein the preset entity comprises at least one of: the RLC entity of the bearer, the PDCP entity of the bearer, or a service data adaptation protocol (SDAP) entity associated with the bearer; and
   wherein the suspending an RLC entity comprises at least one of:
   transmitting, by a receiving RLC entity, all stored at least one of the following to an upper layer: RLC service data units or RLC service data unit segments;
   dropping, by a transmitting RLC entity, all stored RLC protocol data units;
   stopping and resetting, by the RLC entity, all timers; or
   setting, by the RLC entity, all state variables to an initial value.

7. The method of claim 1, wherein in a case where the first mode indication information indicates that the MBS data is received using a PTP mode, the configuring a bearer mode based on the first information comprises at least one of:
   establishing a PTP bearer; or
   resuming a PTP bearer.

8. The method of claim 7,
   the method further comprising: in a case where the MBS data is being received using a PTM bearer before the first information is received, establishing the PTP bearer, and releasing the PTM bearer; or
   in a case where the MBS data is being received using a PTM bearer before the first information is received, resuming the PTP bearer, and suspending the PTM bearer;
   wherein the suspending a PTM bearer comprises at least one of:
   stopping, by a MAC layer, listening to a physical downlink control channel of a radio network temporary identifier which corresponds to the MBS identifier and is used for a multicast/broadcast service;
   suspending transmission of the bearer;
   suspending a PDCP entity of the bearer;
   suspending an RLC entity of the bearer;
   suspending, by a MAC entity, a logical channel of the bearer or dropping data of the logical channel; or
   dropping, by a preset entity, the MBS data;
   wherein the preset entity comprises at least one of: the RLC entity of the bearer, the PDCP entity of the bearer, or an SDAP entity associated with the bearer; or the method further comprising: in a case where the MBS data is being received using the PTP mode and a PTM mode before the first information is received, releasing a PTP bearer or suspending a PTM bearer.

9. The method of claim 1, wherein in a case where the first mode indication information indicates that the MBS data is received using a PTP mode and the PTM mode, the configuring a bearer mode based on the first information comprises at least one of:
in a case where the MBS data is being received using a PTM bearer before the first information is received, establishing a PTP bearer or resuming a PTP bearer; or
in a case where the MBS data is being received using a PTP bearer before the first information is received, establishing a PTM bearer or resuming a PTM bearer.

10. The method of claim 1, wherein the first mode indication information is used for indicating at least one of the following operations for the bearer:
establishing a bearer;
resuming a bearer;
releasing a bearer; or
suspending a bearer, wherein the suspending a bearer comprises suspending a PTP bearer or suspending a PTM bearer;
wherein the resuming a bearer comprises at least one of:
revoking an action of suspending the bearer;
resuming a PDCP entity of the bearer;
resuming, by a MAC entity, a logical channel of the bearer;
transmitting, by the MAC entity, data of the logical channel to an upper layer or a lower layer; or
initiating or using the bearer to receive the MBS data.

11. The method of claim 1, further comprising:
sending second information to a second communication node, wherein the second information comprises: an MBS identifier list and a mode used by the first communication node to receive data corresponding to an MBS identifier.

12. A mode configuration method, applied by a second communication node and comprising:
receiving second information sent by a third communication node;
determining first information based on the second information, wherein the first information is used for instructing a first communication node to configure a bearer mode; and
configuring the bearer mode based on the second information;
wherein the configuring the bearer mode based on the second information comprises at least one of:
in a case where a first mode indication information indicates that none of UEs use a point-to-multipoint (PTM) bearer to receive MBS data, suspending the PTM bearer; or
in a case where a first mode indication information indicates that none of UEs use a point-to-point (PTP) bearer to receive MBS data, suspending the PTP bearer; and
wherein the suspending the PTM bearer or the suspending the PTP bearer comprises:
suspending, by a media access control (MAC) entity, a logical channel of the bearer or dropping data of the logical channel; and
dropping, by a radio link control (RLC) entity of the bearer, the MBS data.

13. The method of claim 12, wherein one of the following applies:
the second information comprises at least one of:
an F1 interface multicast/broadcast service (MBS) identifier, MBS session identifier information, MBS service identifier information, a list of user equipments (UEs) joining an MBS session or service, a UE identifier, a bearer identifier, or the first mode indication information;
in a case where the second communication node is a centralized unit, the third communication node is a distributed unit; and in a case where the second communication node is a distributed unit, the third communication node is a centralized unit; or
the second information is carried by MBS-specific F1AP signaling, UE-specific F1AP signaling or Non-UE specific F1AP signaling.

14. A device, comprising:
one or more processors; and
a memory, configured to store one or more programs;
wherein the one or more programs, when executed by the one or more processors, enable the one or more processors to perform the method of claim 12.

15. A device, comprising:
one or more processors; and
a memory, configured to store one or more programs;
wherein the one or more programs, when executed by the one or more processors, enable the one or more processors to perform the following steps:
receiving first information and configuring a bearer mode based on the first information; and
receiving multicast/broadcast service (MBS) data using the configured bearer mode;
wherein the first information comprises at least one of:
an MBS identifier, an MBS identifier index, first mode indication information, and first bearer configuration information, wherein the MBS identifier index uniquely indexes one MBS identifier;
wherein the first mode indication information is used for indicating a mode to be used for receiving the MBS data;
wherein in a case where the first mode indication information indicates that the MBS data is received using a point-to-multipoint (PTM) mode, the configuring a bearer mode based on the first information comprises at least one of:
establishing a PTM bearer; or
resuming a PTM bearer; and
wherein the resuming a PTM bearer comprises:
initiating or resuming, by a media access control (MAC) layer, listening to a radio network temporary identifier which corresponds to the MBS identifier and is used for a multicast/broadcast service.

* * * * *